(12) United States Patent
Guan et al.

(10) Patent No.: US 11,838,063 B2
(45) Date of Patent: Dec. 5, 2023

(54) ULTRASONIC HUMAN BODY COMMUNICATION METHOD BASED ON A GROUP INDEX MODULATION, AND A DEVICE THEREOF

(71) Applicant: South China University of Technology, Guangdong (CN)

(72) Inventors: Quansheng Guan, Guangdong (CN); Qianqian Wang, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/772,519

(22) PCT Filed: Dec. 18, 2019

(86) PCT No.: PCT/CN2019/126368
§ 371 (c)(1),
(2) Date: Apr. 28, 2022

(87) PCT Pub. No.: WO2021/082221
PCT Pub. Date: May 6, 2021

(65) Prior Publication Data
US 2022/0385376 A1     Dec. 1, 2022

(30) Foreign Application Priority Data
Oct. 29, 2019 (CN) .......................... 201911037665.9

(51) Int. Cl.
*H04B 11/00* (2006.01)
*H04B 13/00* (2006.01)
(Continued)

(52) U.S. Cl.
CPC ........... *H04B 13/005* (2013.01); *H04B 11/00* (2013.01); *H04L 5/0003* (2013.01); *H04L 25/03834* (2013.01)

(58) Field of Classification Search
CPC ........... H04B 11/00; H04B 13/00; H04L 1/00; H04L 5/00; H04L 5/003; H04L 25/03;
(Continued)

(56) References Cited

U.S. PATENT DOCUMENTS 10,277,334 B2    4/2019  Yoo et al.
2012/0171963 A1*  7/2012  Tsfaty .................... H04B 11/00
                                                                   455/41.3
(Continued)

FOREIGN PATENT DOCUMENTS

CN    101199427 A    6/2008
CN    107864423 A    3/2018
(Continued)

OTHER PUBLICATIONS

J. Wang et al, "Body Area Communications" IEEE, Wiley, 2013 (Year: 2013).*
(Continued)

*Primary Examiner* — Shawkat M Ali
(74) *Attorney, Agent, or Firm* — LOZA & LOZA, LLP; Michael F. Fedrick (57) ABSTRACT

Provided are an ultrasonic human body communication method and a device thereof, the method including dividing serial information into blocks, and each information block includes modulation bits and index bits; each transmission frame is divided into multiple groups; performing an index modulation on the groups of each transmission frame, determining activated group sequence numbers; performing a digital modulation on the modulation bits of each information block, and mapping the digitally modulated modulation bits to activated groups; for the multiple information blocks processed in parallel, performing a parallel/serial conversion, a pulse shaping, and an ultrasonic conversion in sequence to obtain a transmission signal, and transmitting
(Continued)

the transmission signal in a human body through a transmission frame; on a receiving node, receiving a received transmission signal propagated by the human body, and demodulating the received transmission signal to obtain the index bits and the modulation bits.

10 Claims, 2 Drawing Sheets

(51) Int. Cl.
  *H04L 5/00* (2006.01)
  *H04L 25/03* (2006.01)
(58) Field of Classification Search
  CPC .... H04L 25/03834; H04L 27/26; H04W 4/00; H04W 4/80; H04W 84/12
  USPC ............... 375/219, 238, 260, 267, 295, 316; 455/41.2, 41.3
  See application file for complete search history.

(56) References Cited

U.S. PATENT DOCUMENTS

| | | | |
|---|---|---|---|
| 2017/0149599 A1 | 5/2017 | Kang et al. | |
| 2017/0279571 A1* | 9/2017 | Melodia | H04L 1/0003 |
| 2018/0262277 A1* | 9/2018 | Koksal | H04L 27/26134 |
| 2019/0229816 A1* | 7/2019 | Kobayashi | H04B 13/005 |

FOREIGN PATENT DOCUMENTS

| | | |
|---|---|---|
| CN | 108289259 A | 7/2018 |
| CN | 108512801 A | 9/2018 |
| CN | 208001352 U | 10/2018 |
| CN | 110166142 A | 8/2019 |

OTHER PUBLICATIONS

Marijan Herceg et al., Inductance Index Modulation for Human Body Communication Systems, IEEE Wireless Communications Letters, Jun. 30, 2019, pp. 937-940, vol. 8, No. 3.
International Search Report of PCT Patent Application No. PCT/CN2019/126368 dated Jul. 29, 2020.

* cited by examiner

ULTRASONIC HUMAN BODY COMMUNICATION METHOD BASED ON A GROUP INDEX MODULATION, AND A DEVICE THEREOF

TECHNICAL FIELD

The present invention relates to the technical fields of physical layer modulations, human body communication and ultrasonic wireless communication, in particular to an ultrasonic human body communication method based on a group index modulation, and a device thereof.

TECHNICAL BACKGROUND

In recent years, with the advancement of medical technology, the miniaturization of medical equipment, and the development of individualized medical needs, significant progress has been made in human body communication research. Human body communication research plays an important role in mobile medical and health monitoring. Implantable human body communication is an important part of human body communication. However, the existing radio frequency communication technology has a high absorption rate in human body communication, with long-term radiation hazards; the transmission node and receiving node of capacitive coupling human body communication need to form a ground loop, which is not suitable for implantable human body communication; galvanic coupling human body communication is limited by the frequency of intra-body communication, and the communication speed is relatively low.

Ultrasound has been used in clinical treatment and diagnosis since 1960. It has no known harmful effects and has been proven to be basically safe for the human body when the power is limited. In the study of the application of ultrasound to human body communication, foreign scholars proposed to transmit narrow pulse signals in time-hopping mode to overcome the multipath effect of the human body. Researchers have proposed algorithms such as rate optimization and bit error rate optimization for the scheme of transmitting narrow pulse signals in time-hopping mode, but they failed to consider the demand for energy consumption. The battery life of implantable devices has a great impact on the use, treatment and effects of the devices.

Index modulation was first proposed by foreign scholars. It is used in multi-antenna wireless communication and carries information through the position index of the antennas. In recent years, researchers have proposed to apply index modulation to the spreading code index of direct spread spectrum, the subcarrier index of orthogonal frequency division multiplexing (OFDM) etc., to increase the information rate and reduce the energy consumption through index modulation. However, directly applying index modulation to the time slot index is not suitable for human body communication. Due to the severe multipath effect in the human body, when multiple pulses are sent in one transmission frame, adjacent pulses will cause serious interference and cause serious bit errors.

SUMMARY OF THE INVENTION

The first objective of the present invention is to overcome the shortcomings and deficiencies of the prior art and to provide an ultrasonic human body communication method based on a group index modulation, which may effectively overcome the human body multipath effect and realize high-speed and energy-saving ultrasonic human body communication.

The second objective of the present invention is to provide an ultrasonic human body communication device based on a group index modulation.

The first objective of the present invention is achieved through the following technical solutions: an ultrasonic human body communication method based on a group index modulation, steps are as follows:

S1. on a transmission node, performing a serial/parallel conversion on serial information, and dividing into multiple information blocks, each information block comprises Y modulation bits and M index bits;

S2. for each transmission frame, dividing it into multiple groups;

S3. performing an index modulation on the groups of each transmission frame, determining activated group sequence numbers corresponding to groups according to the index bits of each information block;

for each information block, performing a digital modulation on the modulation bits of the information block, and mapping the digitally modulated modulation bits to activated groups corresponding to the activated group sequence numbers;

S4. for the multiple information blocks processed in parallel in step S3, performing a parallel/serial conversion, a pulse shaping, and an ultrasonic conversion in sequence to obtain a transmission signal s(t), and transmitting the transmission signal s(t) in a human body through a transmission frame;

S5. on a receiving node, receiving a received transmission signal s'(t) propagated by the human body, and demodulating the received transmission signal s'(t), finally obtaining the index bits and the modulation bits.

Preferably, the transmission node and the receiving node are both located in a wireless communication network using the human body as a transmission medium;

in step S2, according to a number of access nodes, time slots for sending the transmission frames are divided into N groups, a number of time slots in each group is not less than the number of access nodes, assigning each access node a single time slot in a group;

an access node is a transmission node that can be used to send information blocks in a wireless communication network.

Further, in step S3, the digitally modulated modulation bits are mapped to transmission time slots in the activated groups corresponding to the activated group sequence numbers; wherein the transmission time slots are determined by transmission nodes, and different transmission nodes use different time slots as the transmission time slots that carry modulation bits.

Further, performing an index modulation on the groups of each transmission frame, and determining activated group sequence numbers corresponding to groups according to the index bits of each information block, are specifically:

activating K groups of the N groups, the activated K groups are the activated groups, and combination types of the activated K groups are $C_N^K$ types;

obtaining different activated group sequence numbers corresponding to different activated group combinations;

determining the corresponding activated group sequence numbers according to the index bits of each information block, so as to obtain the corresponding activated group combinations;

a relationship between the number M of index bits and the combination types of the activated groups $C_N^K$ is:

$$M=\lfloor \log_2(C_N^K) \rfloor;$$

wherein $\lfloor \cdot \rfloor$ is a floor function;
a relationship between the number Y of modulation bits and the number K of activated groups is:

$$Y=K \log_2 R;$$

the relationship indicates that each group of the K activated groups transmits $\log_2 R$ bits, wherein R is an order of the digital modulation, R is $2^x$, and a positive integer.

Preferably, the digital modulation is a pulse phase modulation, a pulse position modulation, a pulse amplitude modulation, a pulse width modulation or a pulse waveform modulation.

Further, the transmission signal s(t) is an ultrasonic pulse signal;
when the digital modulation is the pulse amplitude modulation, the transmission signal s(t) is as follows:

$$s(t) = \sum_{j=1}^{\infty} \sum_{k=1}^{K} a_{j,k} p(t - jT_s - P_{j,k}T_g - c_j T_c);$$

wherein t is time, j is a sequence number of a transmission frame; k is a sequence number of activated groups; p(t) is a mono-cycle pulse signal, a pulse width of p(t) is less than a width of a time slot; $T_s$ is a time length of a transmission frame; $T_g$ is a time length of a group; $T_c$ is a time length of a time slot; $P_{j,k}$ is the kth activated group in the jth frame; $c_j$ is the time slot sequence number in the groups of the jth transmission frame; $a_{j,k}$ is the modulation bits transmitted in the $c_j$th time slot of the kth activated group in the jth transmission frame.

Preferably, using a maximum likelihood method to demodulate the received transmission signal s'(t) to obtain index bits and modulation bits, processes are as follows:

S51. performing correlation calculations on the received transmission signal s'(t) and multiple template signals $m_l(t)$ respectively, wherein the types of the template signals are $L=R^K C_N^K$ types, l is a sequence number of the template signal, $1 \leq l \leq L$; N is the number of groups; K is the number of activated groups; $C_N^K$ are combination types of K activated groups in N groups; $R^K$ is all combination types of Y modulation bits, $Y=K \log_2 R$ indicates that each group of the K activated groups transmits $\log_2 R$ bits, R is an order of the digital modulation, R is $2^x$, and x is a positive integer;

S52. integrating multiple signals obtained after the correlation calculations respectively within one frame time $T_s$ to obtain integrated signals $Z_l$, specifically as follows:

$$Z_l = \int_{\tau}^{\tau+T_s} [s'(t) m_l(t)] dt;$$

wherein $\tau$ is a starting time of a transmission frame;

S53. according to a maximum likelihood criterion, selecting a maximum signal $\hat{Z}$ from the integrated signal $Z_l$, as follows:

$$\hat{Z} = \underset{\substack{m_l(t) \\ 1 \leq l \leq L}}{\text{Max}} \left\{ \int_{\tau}^{\tau+T_s} [s'(t) m_l(t)] dt \right\};$$

determining a corresponding template signal $\hat{m}$ according to the maximum signal $\hat{Z}$, the determined template signal is a template signal with the largest correlation value;

S54: determining a combination of the activated groups according to the template signal $\hat{m}$ with the largest correlation value, and demodulating the index bits of the received transmission signal from the determined combination of the activated groups;

according to the modulation bits carried by the K activated groups in the template signal $\hat{m}$ with the largest correlation value, demodulating the modulation bits of the received transmission signal.

The second objective of the present invention is achieved through the following technical solutions: an ultrasonic human body communication device based on a group index modulation, comprising: a transmitter module and a receiver module, the transmitter module is wirelessly connected to the receiver module through a human body, wherein the transmitter module comprises a first converter, a group module, an index modulator, a digital modulator, a second converter and a first communication module, the first converter is used to perform a serial/parallel conversion on serial information, and divide into multiple information blocks, and transmit the information blocks to the index modulator and the digital modulator in parallel, wherein each information block comprises Y modulation bits and M index bits;

the group module is used to, for each transmission frame, divide it into multiple groups;

the index modulator is used to perform an index modulation on the groups of each transmission frame, determine activated group sequence numbers corresponding to groups according to the index bits of each information block;

the digital modulator is used to, for each information block, perform a digital modulation on the modulation bits of the information block, and map the digitally modulated modulation bits to activated groups corresponding to the activated group sequence numbers;

the second converter comprises a parallel/serial converter, a pulse shaping module and an ultrasonic transducer, the parallel/serial converter is used to perform parallel/serial conversion of multiple information blocks processed in parallel in the digital modulator;

the pulse shaping module is used to pulse a signal output by the parallel/serial converter; the ultrasonic transducer is used to ultrasonically convert a signal output by the pulse shaping module to obtain a transmission signal s(t);

the first communication module is used to transmit the transmission signal s(t) to the human body by transmitting a transmission frame;

the receiver module comprises a second communication module and a demodulator, wherein, the second communication module is used to receive a received transmission signal s'(t) propagated by the human body, the demodulator is used to demodulate the received transmission signal s'(t) to obtain the index bits and the modulation bits.

Preferably, the digital modulation performed by the digital modulator is a pulse phase modulation, a pulse position modulation, a pulse amplitude modulation, a pulse width modulation or a pulse waveform modulation;

the transmission signal s(t) is an ultrasonic pulse signal, when the digital modulation is the pulse amplitude modulation, the transmission signal s(t) is as follows:

$$s(t) = \sum_{j=1}^{\infty}\sum_{k=1}^{K} a_{j,k} p(t - jT_s - P_{j,k}T_g - c_j T_c);$$

wherein t is time, j is a sequence number of a transmission frame; k is a sequence number of activated groups; p(t) is a mono-cycle pulse signal, a pulse width of p(t) is less than a width of a time slot; $T_s$ is a time length of a transmission frame; $T_g$ is a time length of a group; $T_c$ is a time length of a time slot; $P_{j,k}$ is the kth activated group in the jth frame; $c_j$ is the time slot sequence number in the groups of the jth transmission frame; $a_{j,k}$ is the modulation bits transmitted in the $c_j$th time slot of the kth activated group in the jth transmission frame.

Preferably, the demodulator comprises a correlation operator, an integrator, a maximum value selector, an index bit demodulator, and a modulation bit demodulator, wherein
the correlation operator is used to perform correlation calculations on the received transmission signal s'(t) and multiple template signals $m_l(t)$ respectively, wherein the types of the template signals are $L = R^K C_N^K$ types, l is a sequence number of the template signal, $1 \leq l \leq L$; N is the number of groups; K is the number of activated groups; $C_N^K$ are combination types of K activated groups in N groups; $R^K$ is all combination types of Y modulation bits, $Y = K \log_2 R$ indicates that each group of the K activated groups transmits $\log_2 R$ bits, R is an order of the digital modulation, R is $2^x$, and x is a positive integer;
the integrator is used to integrate multiple signals obtained after the correlation calculations respectively within one frame time $T_s$ to obtain integrated signals $Z_l$, specifically as follows:

$$Z_l = \int_{\tau}^{\tau+T_s} [s'(t) m_l(t)] dt;$$

wherein τ is a starting time of a transmission frame;
the maximum value selector is used to, according to a maximum likelihood criterion, select a maximum signal $\hat{Z}$ from the integrated signal $Z_l$, determine a corresponding template signal according to the maximum signal, the determined template signal is the template signal $\hat{m}$ with the largest correlation value, the maximum signal $\hat{Z}$ as follows:

$$\hat{Z} = \underset{\substack{m_l(t) \\ 1 \leq l \leq L}}{\text{Max}} \left\{ \int_{\tau}^{\tau+T_s} [s'(t) m_l(t)] dt \right\};$$

the index bit demodulator is used to determine a combination of the activated groups according to the template signal $\hat{m}$ with the largest correlation value, and demodulate the index bits of the received transmission signal from the determined combination of the activated groups;
the modulation bit demodulator is used to, according to the modulation bits of the K activated groups in the template signal $\hat{m}$ with the largest correlation value, demodulate the modulation bits of the received transmission signal.

Compared with the prior art, the present invention has the following advantages and effects:
(1) The ultrasonic human body communication method based on a group index modulation of the present invention firstly performs serial/parallel conversion on the transmission node, divides the serial information into multiple information blocks, groups each transmission frame, and performs index modulation on the group, and digitally modulates the modulation bits of each information block; then sequentially perform parallel/serial conversion, pulse shaping, and ultrasonic conversion on multiple information blocks processed in parallel to obtain a transmission signal, and transmit the transmission signal in the human body through a transmission frame; the receiving node receives the transmission signal propagated by the human body, and uses the maximum likelihood method to demodulate the received transmission signal, and finally obtains the index bits and the modulation bits. In the present invention, the activated group is determined by the index bits and the modulation bits are mapped in the activated group, so that the transmission frame may, not only carry information through the transmission signal, but also carry information through the position of the transmission frame that does not require pulse energy, that is, the sequence number of the activated group, to realize that the information bits transmitted in the transmission frame may be increased without increasing the pulse energy, which is beneficial to increase the information transmission rate and reduce the energy consumption. In addition, multiple transmission signals are respectively transmitted through different activated groups, which ensure that the transmission signals will not interfere with each other and overcome the multipath effect. Moreover, the transmission signal of the present invention is an ultrasonic pulse signal, which may be basically safe for the human body during human body communication, and therefore may realize high-speed, low-power-consumption, reliable ultrasonic human body communication.
(2) In the ultrasonic human body communication method based on a group index modulation of the present invention, according to the number of access nodes, the time slot of the transmission frame is correspondingly divided into N groups, and the number of time slots of each group is not less than that of the access node. Each access node is assigned a single time slot in a group; at the same time, the transmission node determines the transmission time slot, and different transmission nodes use different time slots as the transmission time slots that carry modulation bits. Therefore, when multiple transmission nodes want to send a transmission signal, they may send it through different time slots, and send multiple information bits through different time slots at the same time, so as to achieve orderly and efficient communication in the human body.
(3) In the ultrasonic human body communication method based on a group index modulation of the present invention, considering that the noise that may exist when the human body transmits the transmission signal affects the transmission signal, so that the transmission signal received by the receiving node is different from the transmission signal sent by the transmission node, the method of the present invention adopts the maximum likelihood method for demodulation. Firstly, the transmission signal and various template signals are respectively subjected to correlation calculation and integration, and then according to a maximum likelihood criterion, the maximum value signal is selected from them and the maximum correlation value is obtained according to the maximum value signal. In this way, the template signal with the largest correlation value is used as the signal for demodulation, so that the demodulated index bits and modulation bits may be restored to the sequence sent by the transmission node, and reliable human body communication is realized.

DETAILED DESCRIPTION

Hereinafter, the present invention will be further described in detail with reference to the embodiments and figures, but the implementation of the present invention is not limited thereto.

Embodiment 1

Figure 1:
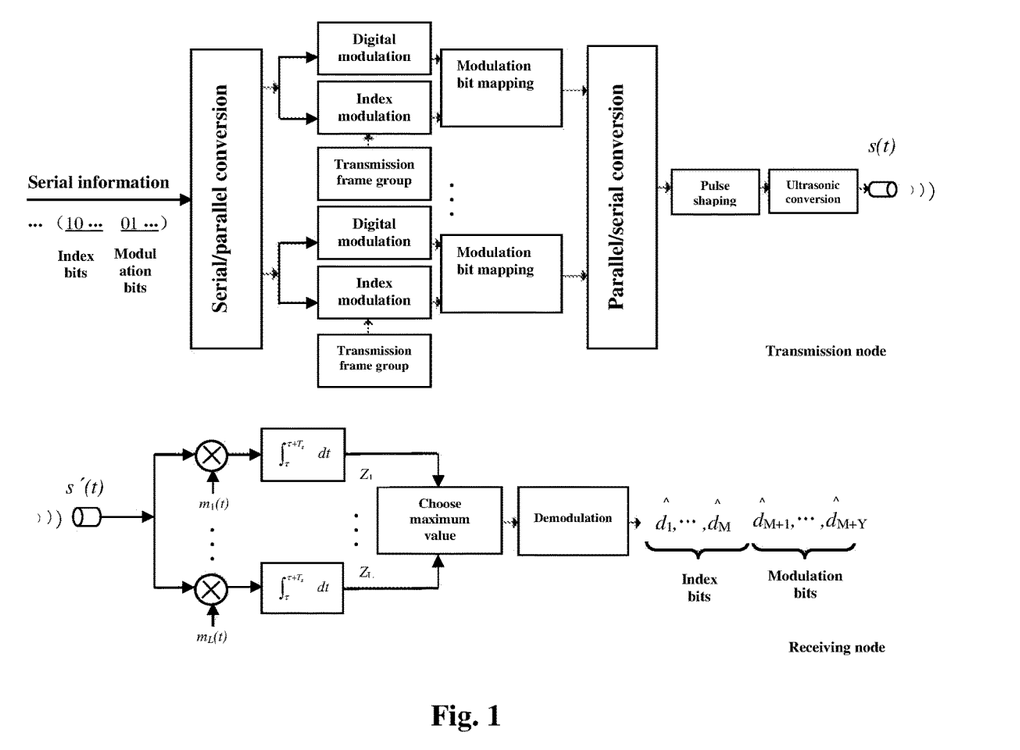
FIG. 1 is an illustrative diagram of a process of an ultrasonic human body communication method based on a group index modulation according to the present invention.

This embodiment discloses an ultrasonic human body communication method based on a group index modulation, as shown in FIG. 1, and the steps are as follows:

S1. on a transmission node, performing a serial/parallel conversion on serial information, and dividing into multiple information blocks, each information block comprises Y modulation bits and M index bits. In this embodiment, every 5 bits is an information block, where the first 3 bits are modulation bits, and the last 2 bits are index bits.

In this embodiment, the transmission node may be, for example, a medical device implanted in a human body, or a wearable sensing device. The transmission node is located in a wireless communication network using the human body as the transmission medium, and the number of transmission nodes may be set to one or more. The wireless communication network also has a receiving node. The receiving node may be, for example, a medical device implanted in the human body or a wearable sensing device. The number of receiving nodes may also be set to one or more. The transmission node and the receiving node realize wireless communication through the human body.

S2. for each transmission frame, dividing it into multiple groups, specifically according to the number of access nodes, dividing the time slot of the transmission frame into N groups, and the number of time slots in each group is not less than the number of access nodes, and each access node is assigned a single time slot in a group; wherein the access nodes refers to the transmission nodes that may be used to send information blocks in the wireless communication network, including transmission nodes that are transmitting data and transmission nodes that are in a dormant state.

In this embodiment, each transmission frame has 16 time slots and 4 access nodes. Therefore, each 4 time slots are divided into 1 group to obtain 4 different groups, and each access node is assigned to a different single time slot in a group.

S3. performing an index modulation on the groups of each transmission frame, determining activated group sequence numbers corresponding to groups according to the index bits of each information block, which is specifically:

Step 1. activating K groups of the N groups, the activated K groups are the activated groups, and combination types of the activated K groups are $C_N^K$ types;

In this embodiment, 3 groups in 4 groups are specifically activated, so the combination types of the activated group are $C_4^3=4$ types, and the details are as follows:

$$\left\{ \begin{matrix} [0\ 1\ 1\ 1], [1\ 0\ 1\ 1] \\ [1\ 1\ 0\ 1], [1\ 1\ 1\ 0] \end{matrix} \right\};$$

In each combination, 1 represents the activated group, and 0 represents the inactive group;

Step 2. obtaining different activated group sequence numbers corresponding to different activated group combinations;

In this embodiment, corresponding to the above activated group combinations, the activated group sequence numbers are specifically as follows:

$$\left\{ \begin{matrix} [1\ 2\ 3], [0\ 2\ 3] \\ [0\ 1\ 3], [0\ 1\ 2] \end{matrix} \right\};$$

That is: the activated group sequence numbers corresponding to the activated group combination [0 1 1 1] are [1 2 3]; the activated group sequence numbers corresponding to the activated group combination [1 0 1 1] are [0 2 3], the activated group sequence numbers corresponding to the activated group combination [1 1 0 1] are [0 1 3] and the activated group sequence numbers corresponding to the activated group combination [1 1 1 0] are [0 1 2].

Step 3. determining the corresponding activated group sequence numbers according to the index bits of each information block, so as to obtain the corresponding activated group combinations;

a relationship between the number M of index bits and the combination types of the activated groups $C_N^K$ is:

$$M=\lfloor \log_2(C_N^K) \rfloor;$$

wherein $\lfloor \cdot \rfloor$ is a floor function.

In this embodiment, the index bits are specifically as the following four types:

{[0 0], [0 1], [1 0], [1 1]};

When the index bits are [0 0], the corresponding activated group sequence numbers are [1 2 3];

When the index bits are [0 1], the corresponding activated group sequence numbers are [0 2 3];

When the index bits are [1 0], the corresponding activated group sequence numbers are [0 1 3];

When the index bits are [1 1], the corresponding activated group sequence numbers are [0 1 2].

A relationship between the number Y of modulation bits and the number K of activated groups is:

$$Y=K \log_2 R;$$

the relationship indicates that each group of the K activated groups transmits $\log_2 R$ bits, wherein R is an order of the digital modulation, R is $2^x$, and x is a positive integer.

In this embodiment, x is equal to 1, the order of digital modulation R is equal to 2, the number of modulation bits Y is equal to the number of activated groups K, that is 3; each modulation bit $\alpha \in \{0, 1\}$.

For each information block, digitally modulating the modulation bits of the information block, and mapping the digitally modulated modulation bits to the activated groups corresponding to the activated group sequence numbers, specifically mapped to the transmission time slots in the activated groups corresponding to the activated group sequence numbers.

Among them, the transmission time slot is determined by the transmission node, and different transmission nodes use different time slots as the transmission time slots that carry modulation bits. For example, in this embodiment, the sequence numbers of the transmission time slots determined by one of the transmission nodes are {1, 1, 1}, and another transmission node is also transmitting transmission signals. In order to avoid conflicts with the current transmission node, this transmission may select other unused time slots as the transmission time slots, for example, the second time slot is selected as the transmission time slot, and the transmission time slot sequence numbers are {2, 2, 2}.

Digital modulation is a pulse phase modulation, a pulse position modulation, a pulse amplitude modulation, a pulse width modulation or a pulse waveform modulation. In this embodiment, the digital modulation is specifically the pulse amplitude modulation, and the modulation bits $\alpha \in \{0, 1\}$ of the information block are modulated to $\alpha \in \{-1, 1\}$ through the binary amplitude modulation method.

S4. for the multiple information blocks processed in parallel in step S3, performing a parallel/serial conversion, a pulse shaping, and an ultrasonic conversion in sequence to obtain a transmission signal s(t), and transmitting the transmission signal s(t) in a human body through a transmission frame.

Figure 2:
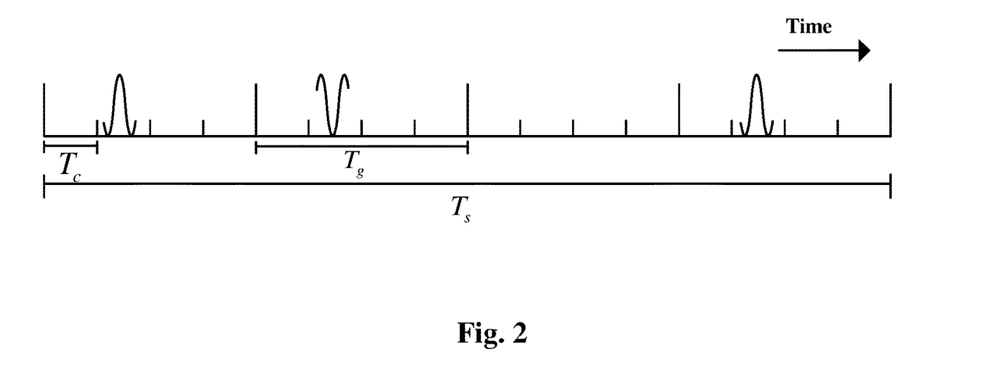
FIG. 2 is an illustrative diagram of a transmission waveform of a transmission frame of the present invention.

As shown in FIG. 2, the transmission signal s(t) is an ultrasonic pulse signal, and the transmission frame carries the ultrasonic pulse signal in a single time slot, that is, the ultrasonic pulse signal is transmitted through the transmission time slot.

In this embodiment, since the digital modulation is pulse amplitude modulation, the corresponding transmission signal s(t) expression is specifically as follows:

$$s(t) = \sum_{j=1}^{\infty}\sum_{k=1}^{K} a_{j,k} p(t - jT_s - P_{j,k}T_g - c_j T_c);$$

wherein t is time, j is a sequence number of a transmission frame; k is a sequence number of activated groups; p(t) is a pulse shaping to obtain a mono-cycle pulse signal, specifically, it may be a Gaussian pulse signal, or a high-order Gaussian differential pulse signal, such as a second derivative pulse of a Gaussian signal; a pulse width of p(t) is less than a width of a time slot; $T_s$ is a time length of a transmission frame; $T_g$ is a time length of a group; $T_c$ is a time length of a time slot, specifically may refer to FIG. 2; $P_{j,k}$ is the kth activated group in the jth frame; $c_j$ is the time slot sequence number in the groups of the jth transmission frame; $a_{j,k}$ is the modulation bits transmitted in the $c_j$th time slot of the kth activated group in the jth transmission frame, that is, the pulse amplitude of p(t).

In this embodiment, if the transmission sequence of the information block is 10110, the sequence numbers of the transmission slot are {1, 1, 1}. FIG. 2 shows the transmission frame $T_s$ and pulse waveform corresponding to the transmission sequence. It can be seen from FIG. 2 that in the direction from left to right, the three ultrasonic pulse signals are all located in the second time slot, that is, the time slot with the time slot sequence number 1 used as the transmission time slot, so the transmission time slot sequence numbers are {1, 1, 1}.

In the direction from left to right, the first, second, and fourth of the four groups are used to carry ultrasonic pulse signals. From this, the activated group sequence numbers are {0, 1, 3}, that is, the combination of the activated groups is [1 1 0 1]. Therefore, the index bits are {1, 0}. In the direction from left to right, the amplitudes of the first ultrasonic pulse signal and the third ultrasonic pulse signal of the three ultrasonic pulse signals are positive, and the amplitude of the second ultrasonic pulse signal is negative. Therefore, the modulation bits are {1, 0, 1}.

Therefore, the information carried by the transmission frame is 10110. It can be seen that the transmission frame can carry complete modulation bits and index bits through the sequence numbers of the activated groups and the pulses of the time slots in the groups.

S5. On a receiving node, receiving a received transmission signal s'(t) propagated by the human body, and demodulating the received transmission signal s'(t), finally obtaining the index bits and the modulation bits.

In this embodiment, since noise may affect the transmission signal during the transmission of the human body, the transmission signal received by the receiving node is different from the transmission signal sent by the transmission node. Therefore, when the transmission signal s(t) reaches the receiving node through the human body, what the receiving node receives is the received transmission signal s'(t).

This embodiment specifically uses a maximum likelihood method for demodulation, and the process is as follows:

S51. performing correlation calculations on the received transmission signal s'(t) and multiple template signals $m_l(t)$ respectively, wherein the types of the template signals are $L=R^K C_N^K$ types, l is a sequence number of the template signal, $1 \leq l \leq L$; $R^K$ are all combination types of $Y=K \log_2 R$ modulation bits.

Since the digital modulation in this embodiment is pulse amplitude modulation, the expression of the corresponding template signal $m_l(t)$ is specifically as follows:

$$m_l(t) = \sum_{j=1}^{\infty}\sum_{k=1}^{K} b_{j,k} p(t - jT_s - P_{j,k}T_g - c_j T_c);$$

in the expression, t is time, j is a sequence number of a transmission frame; k is a sequence number of activated groups; p(t) is a mono-cycle pulse signal, specifically, it may be a Gaussian pulse signal, or a high-order Gaussian differential pulse signal, such as a second derivative pulse of a Gaussian signal; a pulse width of p(t) is less than a width of a time slot; $T_s$ is a time length of a transmission frame; $T_g$ is a time length of a group; $T_c$ is a time length of a time slot; $P_{j,k}$ is the kth activated group in the jth frame; $c_j$ is the time slot sequence number in the groups of the jth transmission frame; $b_{j,k}$ is the modulation bits transmitted in the $c_j$th time slot of the kth activated group in the jth transmission frame, that is, the pulse amplitude of p(t).

In this embodiment, the number of modulation bits Y is 3, the number of index bits M is 2, x is equal to 1, the order of digital modulation R is equal to 2, the number of groups N is 4, and the number of activated groups K is 3. Therefore, the types of template signal are $L=2^3 C_4^3=32$ types.

When the sequence numbers of the time slots in the groups determined by the transmission node are {1, 1, 1}, the template signal with pulse amplitudes of all 1 in the 3 activated groups of the jth transmission frame is expressed as:

$$m_l(t) = \sum_{k=1}^{3} p(t - jT_s - P_{j,k}T_g - T_c).$$

S52. integrating multiple signals obtained after the correlation calculations respectively within one frame time $T_s$ to obtain integrated signals $Z_l$, specifically as follows:

$$Z_l = \int_{\tau}^{\tau+T_s} [s'(t)m_l(t)]dt;$$

wherein $\tau$ is a starting time of a transmission frame;

S53. according to a maximum likelihood criterion, selecting a maximum signal $\hat{Z}$ from the integrated signal $Z_l$, as follows:

$$\hat{Z} = \underset{\substack{m_l(t) \\ 1 \le l \le L}}{\text{Max}} \left\{ \int_{\tau}^{\tau+T_s} [s'(t)m_l(t)]dt \right\};$$

determining a corresponding template signal $\hat{m}$ according to the maximum signal $\hat{Z}$, the determined template signal is a template signal with the maximum correlation value.

The maximum correlation value means: the waveform amplitude of the pulse signal and the waveform amplitude of the transmission signal, and the time slot position of the pulse signal and the time slot position of the transmission signal have the highest similarity.

S54: determining a combination of the activated groups according to the template signal $\hat{m}$ with the largest correlation value, and demodulating the index bits $\hat{d}_1, \ldots, \hat{d}_M$ of the received transmission signal from the determined combination of the activated groups;

according to the modulation bits carried by the K activated groups in the template signal $\hat{m}$ with the largest correlation value, demodulating the modulation bits $\hat{d}_{M+1}, \ldots, \hat{d}_{M+Y}$ of the received transmission signal.

Embodiment 2

Figure 3:
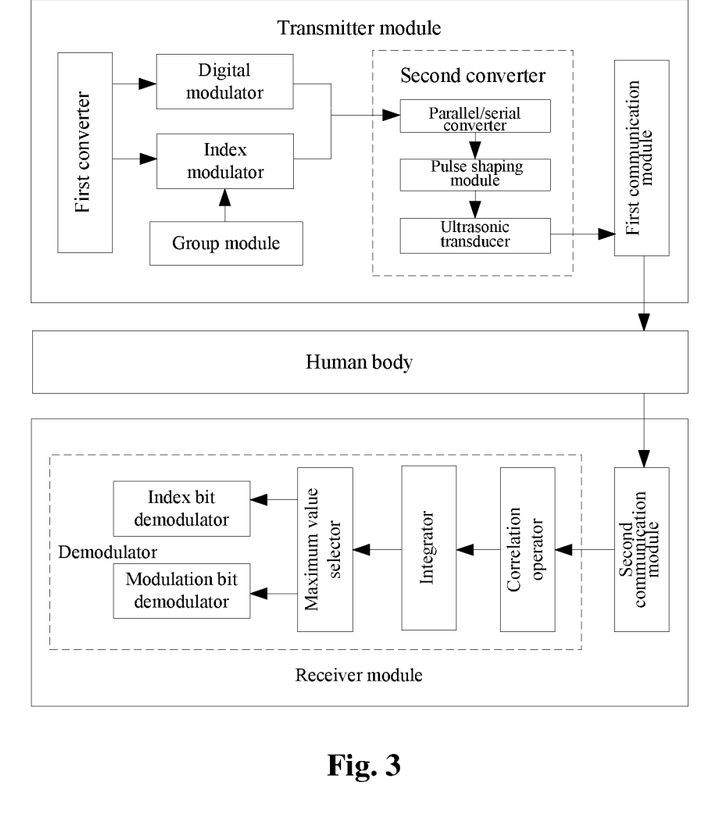
FIG. 3 is a structural block diagram of an ultrasonic human body communication device based on a group index modulation according to the present invention.

This embodiment discloses an ultrasonic human body communication device based on a group index modulation, as shown in FIG. 3, comprising: a transmitter module and a receiver module, the transmitter module is wirelessly connected to the receiver module through a human body; the transmitter module and the receiver module may be, for example, medical devices implanted in the human body, or wearable sensing devices.

Wherein the transmitter module comprises a first converter, a group module, an index modulator, a digital modulator, a second converter and a first communication module:

The first converter is used to perform a serial/parallel conversion on serial information, and divide into multiple information blocks, and transmit the information blocks to the index modulator and the digital modulator in parallel, wherein each information block comprises Y modulation bits and M index bits.

The group module is used to, for each transmission frame, divide it into multiple groups. This embodiment specifically divides the time slots of the transmission frame into N groups according to the number of access nodes. The number of time slots of each group is not less than the number of access nodes, and each access node is assigned a single time slot in a group.

Among them, the access node refers to the transmitter module that can be used to transmit information blocks in the ultrasonic human body communication device.

The index modulator is used to perform an index modulation on the N groups of each transmission frame, determine activated group sequence numbers according to the index bits of each information block.

The digital modulator is used to, for each information block, perform a digital modulation on the modulation bits of the information block, and map the digitally modulated modulation bits to activated groups corresponding to the activated group sequence numbers.

The second converter comprises a parallel/serial converter, a pulse shaping module and an ultrasonic transducer, specifically as follow:

the parallel/serial converter is used to perform parallel/serial conversion of multiple information blocks processed in parallel in the digital modulator;

the pulse shaping module is used to pulse a signal output by the parallel/serial converter;

the ultrasonic transducer is used to ultrasonically convert a signal output by the pulse shaping module to obtain a transmission signal s(t).

The digital modulation performed by the digital modulator is a pulse phase modulation, a pulse position modulation, a pulse amplitude modulation, a pulse width modulation or a pulse waveform modulation; the transmission signal s(t) is an ultrasonic pulse signal. In this embodiment, the digital modulation performed by the digital modulator is the pulse amplitude modulation, and the specific transmission signal s(t) is as follows:

$$s(t) = \sum_{j=1}^{\infty} \sum_{k=1}^{K} a_{j,k} p(t - jT_s - P_{j,k}T_g - c_j T_c);$$

wherein t is time, j is a sequence number of a transmission frame; k is a sequence number of activated groups; p(t) is a mono-cycle pulse signal, specifically, it may be a Gaussian pulse signal, or a high-order Gaussian differential pulse signal, such as a second derivative pulse of a Gaussian signal; a pulse width of p(t) is less than a width of a time slot; $T_s$ is a time length of a transmission frame; $T_g$ is a time length of a group; $T_c$ is a time length of a time slot; $P_{j,k}$ is the kth activated group in the jth frame; $c_j$ is the time slot sequence number in the groups of the jth transmission frame; $a_{j,k}$ is the modulation bits transmitted in the $c_j$th time slot of the kth activated group in the jth transmission frame.

The first communication module is used to transmit the transmission signal to the human body by transmitting a transmission frame.

The receiver module comprises a second communication module and a demodulator, wherein, the second communication module is used to receive a received transmission signal propagated by the human body.

The demodulator is used to demodulate the received transmission signal to obtain the index bits and the modulation bits. The demodulator further comprises a correlation operator, an integrator, a maximum value selector, an index bit demodulator, and a modulation bit demodulator, specifically as follow:

the correlation operator is used to perform correlation calculations on the received transmission signal s'(t) and multiple template signals $M_l(t)$ respectively, wherein the types of the template signals are $L = R^K C_N^K$ types, l is a sequence number of the template signal, $1 \le l \le L$; N is the number of groups; K is the number of activated groups; $C_N^K$ are combination types of K activated groups in N groups; $R^K$ is all combination types of Y modulation bits, $Y=K \log_2 R$ indicates that each group of the K activated groups transmits $\log_2 R$ bits, R is an order of the digital modulation, R is $2^x$, and x is a positive integer.

Since the digital modulation in this embodiment is the pulse amplitude modulation, the expression of the corresponding template signal $m_l(t)$ is specifically as follows:

$$m_l(t) = \sum_{j=1}^{\infty} \sum_{k=1}^{K} b_{j,k} p(t - jT_s - P_{j,k}T_g - c_j T_c);$$

in the expression, t is time, j is a sequence number of a transmission frame; k is a sequence number of activated groups; p(t) is a mono-cycle pulse signal, specifically, it may be a Gaussian pulse signal, or a high-order Gaussian differential pulse signal, such as a second derivative pulse of a Gaussian signal; a pulse width of p(t) is less than a width of a time slot; $T_s$ is a time length of a transmission frame; $T_g$ is a time length of a group; $T_c$ is a time length of a time slot; $P_{j,k}$ is the kth activated group in the jth frame; $c_j$ is the time slot sequence number in the groups of the jth transmission frame; $b_{j,k}$ is the modulation bits transmitted in the $c_j$th time slot of the kth activated group in the jth transmission frame, that is, the pulse amplitude of p(t).

The integrator is used to integrate multiple signals obtained after the correlation calculations respectively within one frame time $T_s$ to obtain integrated signals $Z_l$, specifically as follows:

$$Z_l = \int_{\tau}^{\tau+T_s} [s'(t)m_l(t)]dt;$$

wherein τ is a starting time of a transmission frame;

the maximum value selector is used to, according to a maximum likelihood criterion, select a maximum signal $\hat{Z}$ from the integrated signal $Z_l$, determine a corresponding template signal according to the maximum signal, the determined template signal is the template signal $\hat{m}$ with the largest correlation value, the maximum signal $\hat{Z}$ as follows:

$$\hat{Z} = \underset{\substack{m_l(t) \\ 1 \leq l \leq L}}{\text{Max}} \left\{ \int_{\tau}^{\tau+T_s} [s'(t)m_l(t)]dt \right\}.$$

The index bit demodulator is used to determine a combination of the activated groups according to the template signal $\hat{m}$ with the largest correlation value, and demodulate the index bits of the received transmission signal from the determined combination of the activated groups.

The modulation bit demodulator is used to, according to the modulation bits of the K activated groups in the template signal $\hat{m}$ with the largest correlation value, demodulate the modulation bits of the received transmission signal.

It should be noted here that the device of this embodiment only uses the division of the above-mentioned functional modules as an example. In practical applications, the above-mentioned function allocation may be completed by different functional modules according to needs, that is, the internal structure is divided into different functional modules to complete all or part of the functions described above.

The above-mentioned embodiments are preferred embodiments of the present invention, but the embodiments of the present invention are not limited by the above-mentioned embodiments, and any other changes, modifications, substitutions, combinations, simplification made without departing from the spirit and principle of the present invention, all should be equivalent replacement methods, and they are all included in the protection scope of the present invention.

The invention claimed is:

1. An ultrasonic human body communication method based on a group index modulation, wherein the method comprises the following steps:
   S1. on a transmission node, performing a serial-to-parallel conversion on serial information, and dividing into multiple information blocks, wherein each information block comprises Y modulation bits and M index bits;
   S2. for each transmission frame, dividing the transmission frame into multiple groups;
   S3. performing an index modulation on the groups of each transmission frame, and determining activated group sequence numbers corresponding to the groups according to the index bits of each information block;
   for each information block, performing a digital modulation on the modulation bits of the information block, and mapping the digitally modulated modulation bits to activated groups corresponding to the activated group sequence numbers;
   S4. for the multiple information blocks processed in parallel in step S3, performing a parallel-to-serial conversion, a pulse shaping, and an ultrasonic conversion in sequence to obtain a transmission signal s(t), and transmitting the transmission signal s(t) in a human body through the transmission frame; and
   S5. on a receiving node, receiving a received transmission signal s'(t) propagated by the human body, demodulating the received transmission signal s'(t), and obtaining the index bits and the modulation bits.

2. The ultrasonic human body communication method based on a group index modulation according to claim 1, wherein the transmission node and the receiving node are both located in a wireless communication network using the human body as a transmission medium, wherein:
   in step S2, according to a number of access nodes, time slots for sending the transmission frames are divided into N groups, a number of time slots in each group is not less than the number of access nodes, assigning each access node a single time slot in a group; and
   an access node is the transmission node that is used to send information blocks in the wireless communication network.

3. The ultrasonic human body communication method based on a group index modulation according to claim 2, wherein in step S3, the digitally modulated modulation bits are mapped to transmission time slots in the activated groups corresponding to the activated group sequence numbers, wherein the transmission time slots are determined by transmission nodes, and wherein different transmission nodes use different time slots as the transmission time slots that carry the modulation bits.

4. The ultrasonic human body communication method based on a group index modulation according to claim 2, wherein performing the index modulation on the groups of each transmission frame, and determining activated group sequence numbers corresponding to the groups according to the index bits of each information block, are specifically:
   activating K groups of the N groups, the activated K groups are the activated groups, and combination types of the activated K groups are $C_N^K$ types;

obtaining different activated group sequence numbers corresponding to different activated group combinations;

determining the corresponding activated group sequence numbers according to the index bits of each information block, to obtain the corresponding activated group combinations;

a relationship between the number M of index bits and the combination types of the activated groups $C_N^K$ is:

$$M = \lfloor \log_2(C_N^K) \rfloor;$$

wherein $\lfloor \cdot \rfloor$ is a floor function; and a relationship between the number Y of modulation bits and the number K of activated groups is:

$$Y = K \log_2 R;$$

wherein the relationship indicates that each group of the K activated groups transmits $\log_2 R$ bits, wherein R is an order of the digital modulation, R is $2^x$, and x is a positive integer.

5. The ultrasonic human body communication method based on a group index modulation according to claim 1, wherein the digital modulation is a pulse phase modulation, a pulse position modulation, a pulse amplitude modulation, a pulse width modulation or a pulse waveform modulation.

6. The ultrasonic human body communication method based on a group index modulation according to claim 5, wherein the transmission signal s(t) is an ultrasonic pulse signal;

when the digital modulation is the pulse amplitude modulation, the transmission signal s(t) is as follows:

$$s(t) = \sum_{j=1}^{\infty}\sum_{k=1}^{K} a_{j,k} p(t - jT_s - P_{j,k}T_g - c_j T_c);$$

wherein t is time, j is a sequence number of the transmission frame; k is a sequence number of activated groups; p(t) is a mono-cycle pulse signal, a pulse width of p(t) is less than a width of a time slot; $T_s$ is a time length of the transmission frame; $T_g$ is a time length of a group; $T_c$ is a time length of a time slot; $P_{j,k}$ is the kth activated group in the jth frame; $c_j$ is the time slot sequence number in the groups of the jth transmission frame; $a_{j,k}$ is the modulation bits transmitted in the $c_j$th time slot of the kth activated group in the jth transmission frame.

7. The ultrasonic human body communication method based on a group index modulation according to claim 1, wherein using a maximum likelihood method to demodulate the received transmission signal s'(t) to obtain index bits and modulation bits, processes are performed as follows:

S51. performing correlation calculations on the received transmission signal s'(t) and multiple template signals $m_l(t)$ respectively, wherein the types of the template signals are $L = R^K C_N^K$ types, l is a sequence number of the template signal, $1 \leq l \leq L$; N is the number of groups; K is the number of activated groups; $C_N^K$ are combination types of K activated groups in N groups; $R^K$ is all combination types of Y modulation bits, $Y = K \log_2 R$ indicates that each group of the K activated groups transmits $\log_2 R$ bits, R is an order of the digital modulation, R is $2^x$, and x is a positive integer;

S52. integrating multiple signals obtained after the correlation calculations respectively within one frame time $T_s$ to obtain integrated signals $Z_l$, specifically as follows:

$$Z_l = \int_{\tau}^{\tau+T_s}[s'(t)m_l(t)]dt;$$

wherein $\tau$ is a starting time of a transmission frame;

S53. according to a maximum likelihood criterion, selecting a maximum signal $\hat{Z}$ from the integrated signal $Z_l$, as follows:

$$\hat{Z} = \underset{\substack{m_l(t) \\ 1 \leq l \leq L}}{\text{Max}}\left\{\int_{\tau}^{\tau+T_s}[s'(t)m_l(t)]dt\right\};$$

determining a corresponding template signal $\hat{m}$ according to the maximum signal $\hat{Z}$, the determined template signal is a template signal with the largest correlation value; and S54: determining a combination of the activated groups according to the template signal $\hat{m}$ with the largest correlation value, and demodulating the index bits of the received transmission signal from the determined combination of the activated groups, and according to the modulation bits carried by the K activated groups in the template signal $\hat{m}$ with the largest correlation value, demodulating the modulation bits of the received transmission signal.

8. An ultrasonic human body communication device based on a group index modulation, comprising: a transmitter module and a receiver module, wherein the transmitter module is wirelessly connected to the receiver module through a human body, and wherein the transmitter module comprises a first converter, a group module, an index modulator, a digital modulator, a second converter and a first communication module, wherein:

the first converter is used to perform a serial-to-parallel conversion on serial information, and divide into multiple information blocks, and transmit the information blocks to the index modulator and the digital modulator in parallel, wherein each information block comprises Y modulation bits and M index bits;

the group module is used to, for each transmission frame, divide it into multiple groups;

the index modulator is used to perform an index modulation on the groups of each transmission frame and determine activated group sequence numbers corresponding to the groups according to the index bits of each information block;

the digital modulator is used to, for each information block, perform a digital modulation on the modulation bits of the information block and map digitally modulated modulation bits to activated groups corresponding to the activated group sequence numbers;

the second converter comprises a parallel-to-serial converter, a pulse shaping module and an ultrasonic transducer, the parallel-to-serial converter is used to perform parallel-to-serial conversion of the multiple information blocks processed in parallel in the digital modulator;

the pulse shaping module is used to pulse a signal output by the parallel-to-serial converter;

the ultrasonic transducer is used to ultrasonically convert a signal output by the pulse shaping module to obtain a transmission signal s(t);

the first communication module is used to transmit the transmission signal s(t) to the human body by transmitting a transmission frame; and the receiver module comprises a second communication module and a demodulator, wherein, the second communication module is used to receive a received transmission signal s'(t) propagated by the human body, and the demodulator is used to demodulate the received transmission signal s'(t) to obtain the index bits and the modulation bits.

9. The ultrasonic human body communication device based on a group index modulation according to claim 8, wherein the digital modulation performed by the digital modulator is a pulse phase modulation, a pulse position modulation, a pulse amplitude modulation, a pulse width modulation or a pulse waveform modulation; and the transmission signal s(t) is an ultrasonic pulse signal, when the digital modulation is the pulse amplitude modulation, the transmission signal s(t) is as follows:

$$s(t) = \sum_{j=1}^{\infty}\sum_{k=1}^{K} a_{j,k} p(t - jT_s - P_{j,k}T_g - c_j T_c);$$

wherein t is time, j is a sequence number of the transmission frame; k is a sequence number of activated groups; p(t) is a mono-cycle pulse signal, a pulse width of p(t) is less than a width of a time slot; $T_s$ is a time length of the transmission frame; $T_g$ is a time length of a group; $T_c$ is a time length of a time slot; $P_{j,k}$ is the kth activated group in the jth frame; $c_j$ is the time slot sequence number in the groups of the jth transmission frame; $a_{j,k}$ is the modulation bits transmitted in the $c_j$th time slot of the kth activated group in the jth transmission frame.

10. The ultrasonic human body communication device based on a group index modulation according to claim 8, wherein the demodulator comprises a correlation operator, an integrator, a maximum value selector, an index bit demodulator, and a modulation bit demodulator, wherein the correlation operator is used to perform correlation calculations on the received transmission signal s'(t) and multiple template signals $m_l(t)$ respectively, wherein the types of the template signals are $L=R^K C_N^K$ types, l is a sequence number of the template signal, $1 \leq l \leq L$; N is the number of groups; K is the number of activated groups; $C_N^K$ are combination types of K activated groups in N groups; $R^K$ is all combination types of Y modulation bits, $Y=K \log_2 R$ indicates that each group of the K activated groups transmits $\log_2 R$ bits, R is an order of the digital modulation, R is $2^x$, and x is a positive integer;

the integrator is used to integrate multiple signals obtained after the correlation calculations respectively within one frame time $T_s$ to obtain integrated signals $Z_l$, specifically as follows:

$$Z_l = \int_\tau^{\tau+T_s} [s'(t)m_l(t)]dt;$$

wherein $\tau$ is a starting time of the transmission frame;

the maximum value selector is used to, according to a maximum likelihood criterion, select a maximum signal $\hat{Z}$ from the integrated signal $Z_l$, determine a corresponding template signal according to the maximum signal, the determined template signal is the template signal $\hat{m}$ with the largest correlation value, the maximum signal $\hat{Z}$ as follows:

$$\hat{Z} = \underset{\substack{m_l(t) \\ 1 \leq l \leq L}}{\text{Max}} \left\{ \int_\tau^{\tau+T_s} [s'(t)m_l(t)]dt \right\};$$

the index bit demodulator is used to determine a combination of the activated groups according to the template signal $\hat{m}$ with the largest correlation value, and demodulate the index bits of the received transmission signal from the determined combination of the activated groups; and the modulation bit demodulator is used to, according to the modulation bits of the K activated groups in the template signal $\hat{m}$ with the largest correlation value, demodulate the modulation bits of the received transmission signal.

* * * * *